United States Patent [19]

Cande

[11] 4,124,094
[45] Nov. 7, 1978

[54] PORTABLE PLATFORM DEVICE

[76] Inventor: Donald P. Cande, 16 The Spur, Locust Valley, N.Y. 11560

[21] Appl. No.: 724,629

[22] Filed: Sep. 20, 1976

[51] Int. Cl.² ............................................. A47C 9/10
[52] U.S. Cl. .................. 182/187; 108/151; 182/20
[58] Field of Search ............... 182/187, 3, 4, 9, 20; 248/231; 108/144, 151, 152

[56] References Cited

U.S. PATENT DOCUMENTS

| 1,419,370 | 6/1922 | Genaille | 24/129 A |
| 1,542,548 | 6/1925 | Gordon | 182/187 |
| 2,847,059 | 8/1958 | Klins | 182/187 |
| 3,352,379 | 11/1967 | Riggs | 182/187 |
| 3,353,629 | 11/1967 | Brunes | 182/187 |
| 3,485,320 | 12/1969 | Jones | 182/187 |
| 3,664,460 | 5/1972 | Droik | 182/187 |
| 3,749,200 | 7/1973 | Meyer | 182/187 |

Primary Examiner—Reinaldo P. Machado
Attorney, Agent, or Firm—Morgan, Finnegan, Pine, Foley & Lee

[57] ABSTRACT

A generally flat platform member is reinforced by a pair of support struts mounted to its bottom side, with a flexible fastener adjustably coupled between the two reinforcing struts by a tension clamp. The flexible fastener is adapted to extend generally parallel to the plane defined by the platform member, when mounted to a tree or other upstanding support, for securely mounting the platform member to the upstanding support. Advantageously, the support struts may be pivotally mounted to the platform member to accommodate upstanding supports of various sizes, and enable folding into a compact back-pack frame. The platform may also be formed with a rounded indentation along a portion of its back edge for abutting the support, and may include a reinforcing member thereat.

13 Claims, 12 Drawing Figures

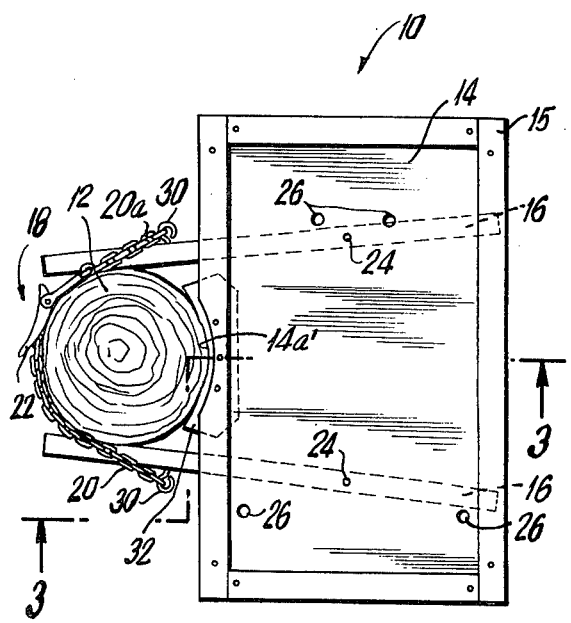
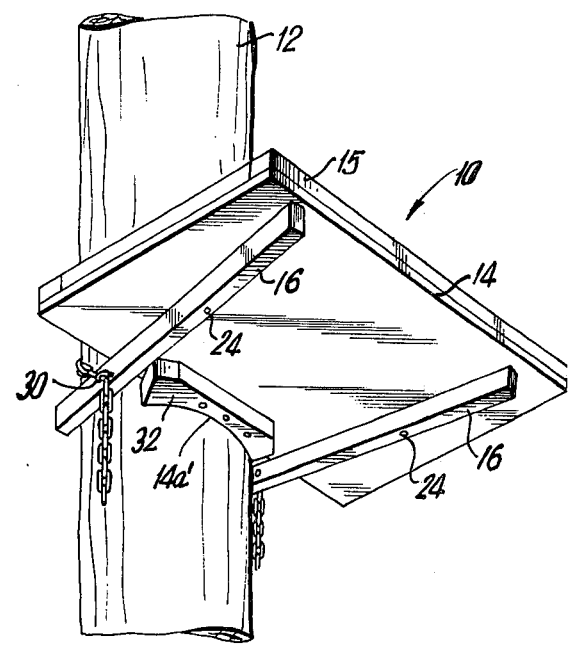
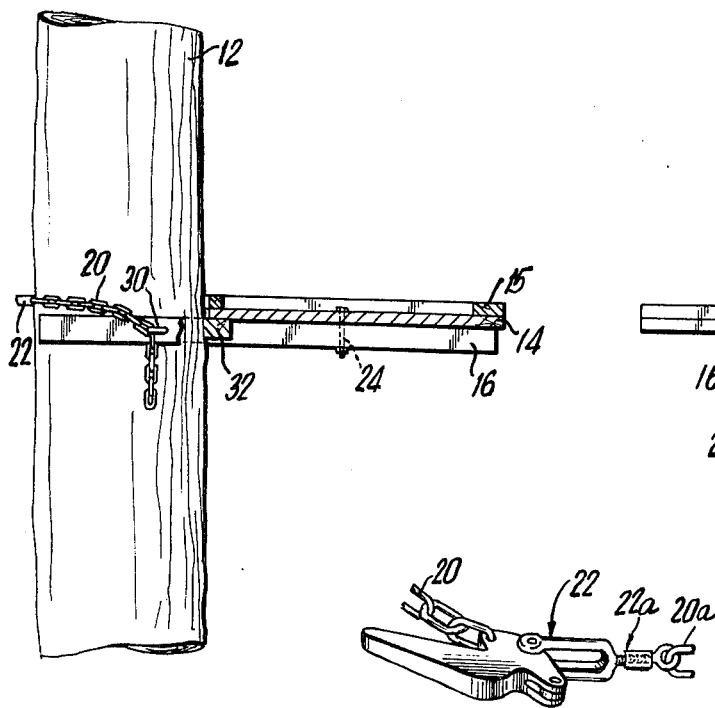
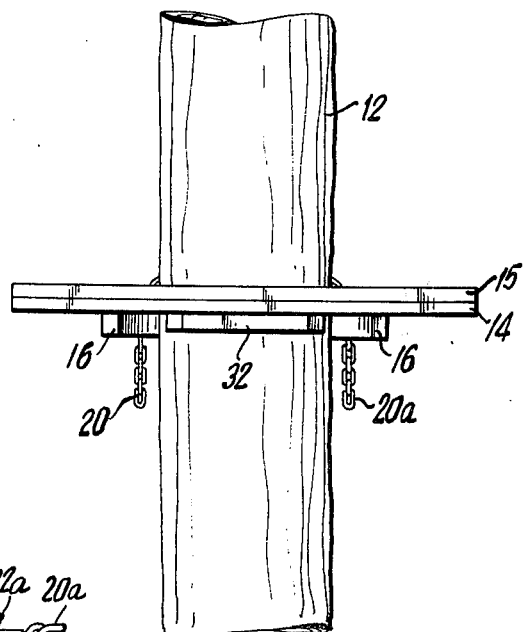
FIG.2  FIG.1  FIG.3  FIG.5  FIG.4

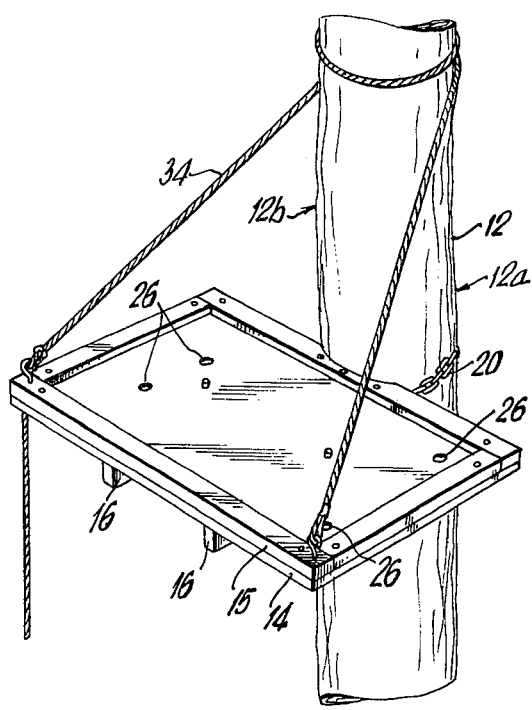
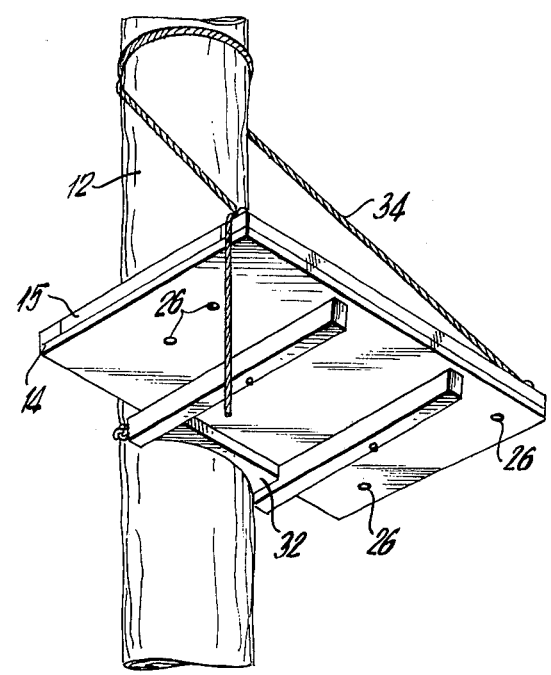
FIG. 8   FIG. 9
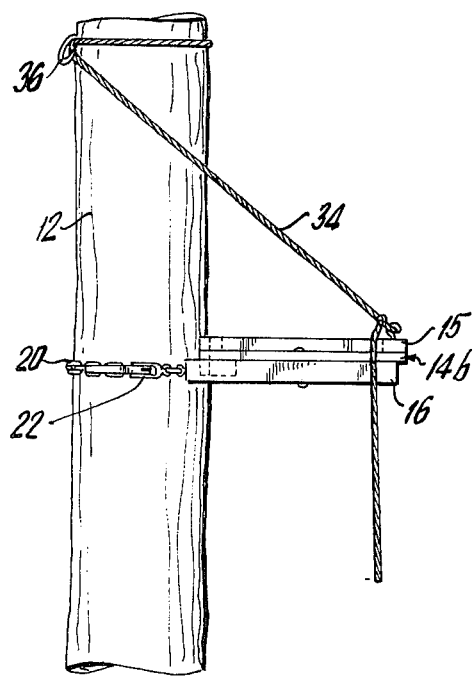
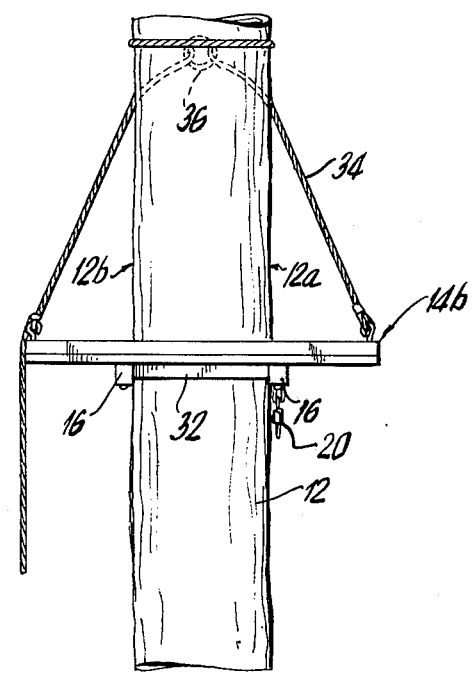
FIG. 10   FIG. 11

PORTABLE PLATFORM DEVICE

BACKGROUND AND OBJECTS OF THE INVENTION

The present invention relates generally to portable platform devices, and more particularly to a portable platform adapted to be secured to an upstanding support, such as a tree or utility pole, to provide a seat, stand, shelf and the like at an elevated position on the support.

In such outdoor sports as hunting, fishing and camping, it is often desirable to have a platform which can be easily attached to a tree or other suitable upstanding support structure, for storing equipment and food in a high, dry, place and/or for providing a level seat or stand elevated from the ground to enable observation from a good vantage point. In order to be as practical as possible, such platform must be lightweight, self-contained and non-encumbering, yet it must be strong and stable when mounted to the support for satisfying the demands of hunters and other sportsmen.

Various types of tree stands are known in the prior art. Some of these, such as disclosed in U.S. Pat. No. 1,823,385 to Barker, include several support members and platform sections disposed so as to balance against each other when mounted on opposing sides of the support. Other devices such as U.S. Pat. No. 2,991,842 to Hardin require nails or spikes for complete installation, thereby damaging the support member and risking injury thereto when the support is a tree.

It is therefore an object of the present invention to provide a new and improved portable platform device. Another object of the invention is to provide a new and improved portable platform device which is compact and self-contained.

It is also an object of the present invention to provide a new and improved portable platform device characterized by simple construction, and which can be made from an inexpensive material such as wood.

It is a further object of the present invention to provide a new and improved portable platform device which is capable of supporting a person sitting, squatting or standing thereon and remaining substantially stable during movements by the person or jolts caused, for example, by firing a rifle or shooting an arrow.

It is still another object of the present invention to provide a new and improved platform device which is capable of being mounted to an upstanding support by a single fastener.

It is an additional object of the present invention to provide a new and improved portable platform device which can be mounted to trees or other supports of greatly varying diameters without requiring nails or other piercing fasteners and which can be folded into a convenient back-pack frame.

Objects and advantages of the present invention are, in part, set forth herein and in part, will be appreciated herefrom, or may be learned by practice with the invention, as defined more fully in the appended claims. Accordingly, the invention resides in the novel structures, combinations and improvements herein shown and described.

SUMMARY OF THE INVENTION

Briefly described, the portable platform device according to the present invention comprises an essentially flat platform member, a pair of support struts mounted to the bottom surface of the platform member and flexible fastener means coupled to back portions of the two support struts, with a tension clamp therebetween, to be wrapped around a tree or other upstanding support for mounting the platform member to the support by forces acting generally parallel to the plane defined by the platform member when mounted to the support. As preferably embodied, the support struts are pivotally mounted to the bottom of the platform member and are adapted to extend beyond the back edge of the platform member when disposed for mounting to the upstanding support. In addition, the platform member may be provided with a rounded indentation in the portion of its back edge abutting the upstanding support and with a correspondingly indented reinforcing member along the same portion.

Advantageously, and as here preferably embodied, the flexible fastener means are attached to the outwardly facing side surfaces of the struts, generally near the portions thereof, which are essentially below the back edge of the platform member. In addition, the struts are dimensioned to extend, when disposed for mounting the platform member to the upstanding support, sufficiently beyond the back edge of the platform member to permit the flexible fastener means to be wound over the top edge of the struts, when fastened around the upstanding support.

Alternatively, the fastener means may be attached to the back edges, or butt portions, of the struts which may be adapted to extend only a little beyond the back edge of the platform member when disposed for mounting to the upstanding support. Advantageously, and as here preferably embodied, a flexible rope truss extends diagonally upwardly from the front corners of the platform member and is wrapped around the upstanding support in a somewhat doubled-over manner through a steel ring in order to provide support capability for heavy loading.

It will be apparent from the foregoing general description that the objects of the invention specifically enumerated herein are achieved by the invention as herein disclosed. Thus, it has been found that a portable platform device may be constructed in accordance with the present invention, which is lightweight and compact, and capable of relatively simple and easy mounting to the upstanding support without necessitating nails or other piercing fasteners. In addition, the portable platform is adapted to be capable of supporting relatively heavy loads with substantial stability. Accordingly, the portable platform according to the present invention may conveniently be used as a shelf or table for campers, a seat or stand for hunters, or a work platform on utility poles and the like for workmen.

It has also been found that by pivotally mounting the support struts to the bottom of the platform member, the platform can be secured to irregularly shaped supports as well as supports of greatly varying dimensions. Moreover, when the portable platform is removed from the support, the struts and fastening means can be folded to provide a compact back-pack frame which can be attached to a person's back by a simple rope.

In addition, it has been found that by attaching the flexible fastening means to the struts such that they are wrapped over the top edge of the strut when tightened around the upstanding support, only a single fastener is necessary for mounting the platform to the upstanding support yet the device is capable of supporting relatively heavy loads and withstanding shifts in the location of the load.

Furthermore, the simple attachment means for the portable platform device according to the invention permits mounting to most trees, generally irrespective of the location of its branches.

It will be understood that the foregoing general description as well as the following detailed description are illustrative and explanatory of the invention, but are not restrictive thereof. Accordingly, the accompanying drawings, referred to herein and constituting a part hereof, illustrate preferred embodiments of the invention, and together with the detailed description, serve to explain the principles of the invention.

BRIEF DESCRIPTION OF THE DRAWINGS

FIG. 1 is a perspective view, from below, of a portable platform device in accordance with the present invention.

FIG. 2 is a plan view of the portable platform device illustrated in FIG. 1.

FIG. 3 is a view taken along Section 3—3 of FIG. 2.

FIG. 4 is a front view of the portable platform device illustrated in FIG. 1.

FIG. 5 is a perspective view of an exemplary tension clamp utilized in the present invention.

FIG. 8 is a perspective view, from above, of a modified embodiment of a portable platform device in accordance with the present invention.

FIG. 9 is a perspective view, from below, of the portable platform device illustrated in FIG. 8.

FIG. 10 is a view taken along Section 9—9 of FIG. 9.

FIG. 11 is a front view of the portable platform device illustrated in FIG. 8.

DETAILED DESCRIPTION OF PREFERRED EMBODIMENTS

Figure 7A:
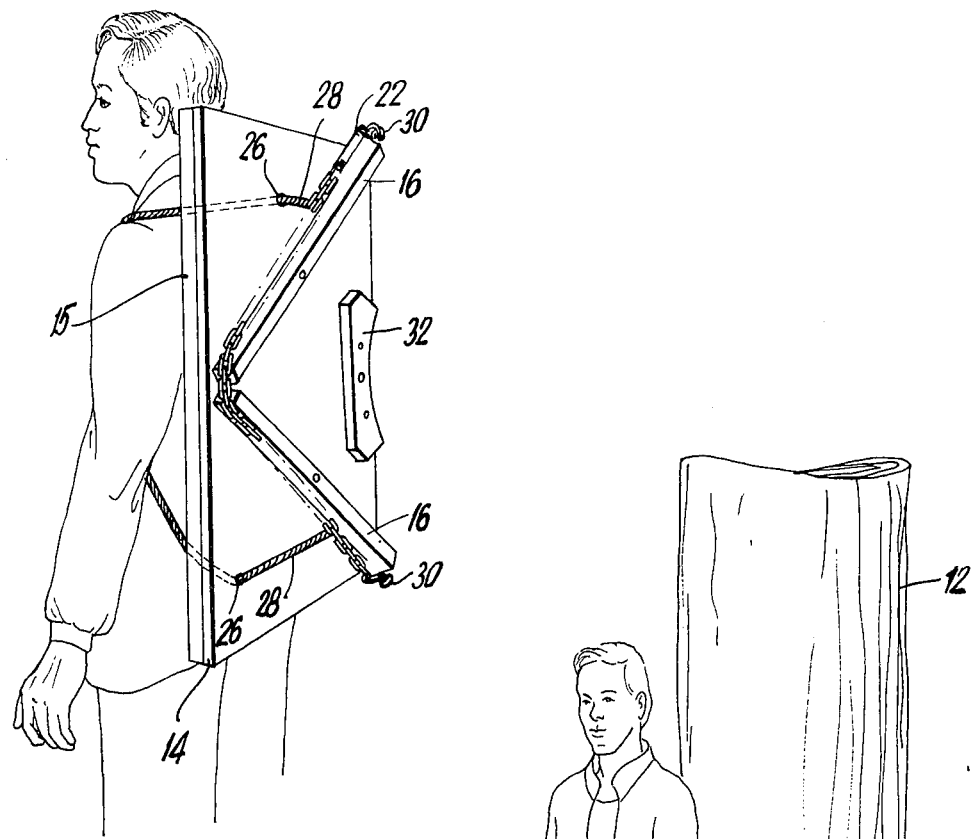
FIG. 7a is a perspective view, from behind, of one embodiment of a folded portable platform device according to the present invention, being used as a backpack frame.

Referring now to the embodiments of the invention shown in the accompanying drawings, wherein like reference characters refer to like parts throughout the various views, there are illustrated, in FIGS. 1-11, preferred embodiments of the portable platform device according to the present invention. The embodiments of the invention, indicated generally by reference number 10, are adapted to be mounted to a suitable upstanding support structure 12, such as a tree, utility pole and the like.

Broadly described, the portable platform device according to the invention is comprised of generally flat platform member 14, two main support struts 16 mounted to the bottom surface of platform member 14 and adjustable mounting means, indicated generally by reference number 18, attached to both struts 16 and adapted to be wrapped around support 12 for mounting device 10 to support 12. Advantageously, platform member 14 may be made of any suitable lightweight material. However, for lightweight and inexpensive construction, platform member 14 may be a piece of about ½ to about ¾ inch plywood and support struts 16 may be 2" × 4" or 2" × 3" sections of wood. In addition, platform member 14 may be provided with reinforcing border 15, also made from plywood of similar thickness, which is bonded or bolted to platform member 14.

Advantageously, adjustable mounting means 18 includes at least one generally flexible fastening strap 20 attached to one of the two support struts 16 and adjustable tension clamp 22 coupled to the other support strut. For installation, therefore, platform member 14 may be placed with its back edge 14a abutting the upstanding support structure 12 and secured thereto by wrapping adjustable mounting means 18 (i.e., fastening strap 20 and tension clamp 22), which is attached to the two support struts 16, around support structure 12. Thereafter, clamp 22 may be tightened to provide a taut fastening force in strap 20, disposed generally parallel to the plane defined by platform 14. Referring now more particularly to FIGS. 1-4, there is shown a preferred embodiment of the present invention. According to this embodiment, adjustable mounting means 18 includes first generally flexible fastening strap 20, second generally flexible fastening strap 20a, each adapted for attachment to one of support struts 16, and tension clamp 22 adapted for attachment to and coupling the free ends of straps 20 and 20a, thereby to form adjustable mounting means to be wrapped around support 12. Advantageously, straps 20 and 20a are attached to the outwardly facing side surfaces of struts 16, at points generally below the back edge 14a and generally near the plane defined by the back edge 14a of platform member 14. In addition, and as best illustrated in FIG. 2, struts 16 are dimensioned to extend beyond back edge 14a when disposed for mounting to support 12, such that straps 20 and 20a can be wrapped over the top edges of their corresponding struts 16 when tightened around support 12. Thus, straps 20 and 20a are adapted for bearing against the top edges of struts 16 when tightened around support 12. Advantageously, struts 16 are adapted to extend at least about 6 inches beyond back edge 14a, and preferably about 8 inches.

Accordingly, when platform 14 is mounted to upstanding support 12 by straps 20 and 20a overlying the top edge of struts 16, the struts can bear against the straps when platform 14 is loaded, thereby increasing the tension induced in straps 20 and 20a to support such loading. Thus, with the elongated struts 16 adapted to bear against taut mounting straps 20 and 20a, platform device 10 can be simply attached to support structure 12 by only one mounting strap, yet is capable of supporting a person, or any relatively heavy load, while remaining substantially stable under sudden movements by the person or any shifting of the load thereon, thereby to provide a seat or stand which is particularly useful for hunters or a work platform for use on utility poles or trees.

As preferably embodied, support struts 16 are pivotally mounted to platform member 14, such as by bolts 24 extending through boreholes formed in each of struts 16 and in platform 14. Accordingly, pivotally mounted struts 16 enable device 10 to be mounted to support structures 12 of greatly differing diameters and/or shapes. Therefore, for the embodiment described hereinbefore with reference to FIGS. 1-4, struts 16 are dimensioned such that straps 20 and 20a overly the top edges thereof when disposed for mounting to support 12.

Figure 6:
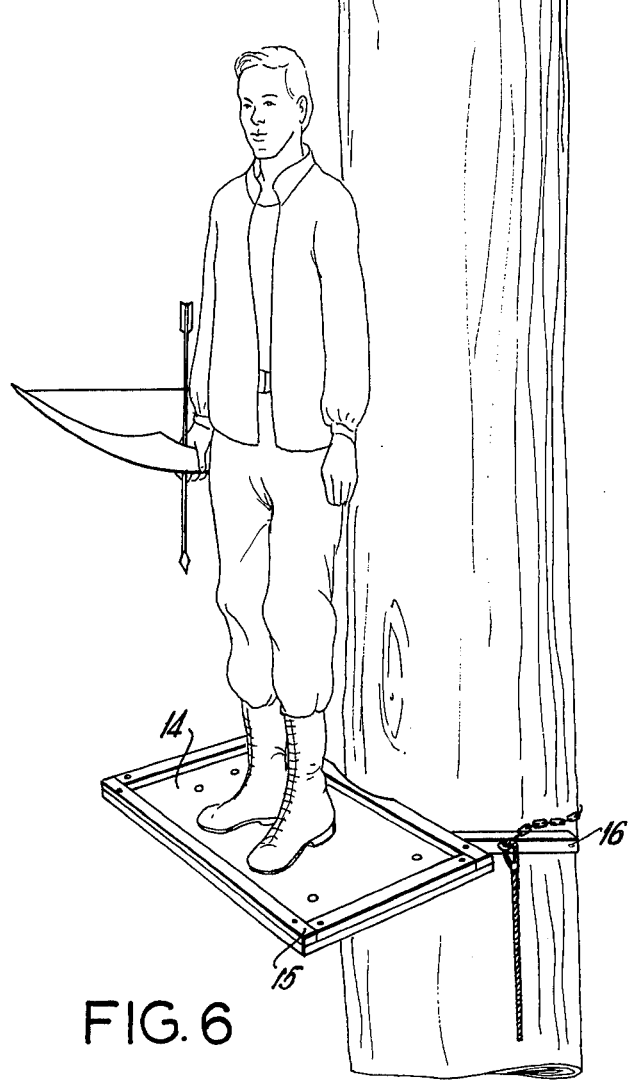
FIG. 6 is a perspective view showing an exemplary use of the portable platform device of FIG. 1.

Thus, when device 10 is mounted to support structures of relatively small diameter (about 12 inches), such as utility poles or moderately sized trees, struts 16 will abut support 12 and form a relatively small opening between its back ends, as illustrated in FIGS. 1 and 2. However, for substantially larger structures, such as illustrated in FIG. 6, the opening between the rearwardly extending portions of struts 16 can be greatly enlarged to accommodate the greater diameters. In this context, and for the embodiment described with reference to FIGS. 1-4, struts 16 are dimensioned to extend at least about 8 inches beyond edge 14a when oriented generally perpendicular thereto, in order to ensure that straps 20 and 20a will overly the top edges of struts 16 when wrapped around different supports 12 of both large and small diameters, for secure and stable mounting thereto.

Figure 7B:
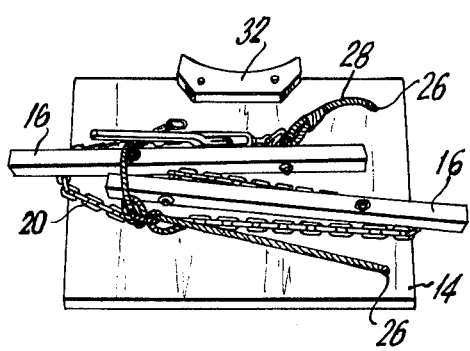
FIG. 7b is a view of the bottom of another embodiment of a folded portable platform device according to the present invention, capable of being used as a backpack frame.

In addition, the pivotal mounting of struts 16 enable device 70 to be folded into a convenient carrying package or back-pack frame, as illustrated in FIG. 7b. To this end, holes 26 may be formed in platform member 14 in spaced, generally symmetrical relation, to permit insertion of any convenient rope-like member 28 for wrapping around a person's shoulders.

Advantageously, elongate straps 20 and 20a may be comprised of a length of chain, one end of each of sections 20 and 20a being secured to tension clamp 22. In addition, at least one of chain straps 20 and 22a may be removably attached to its corresponding strut 16, such as by an eyelet or hook fastener 30, to permit varying the effective length of sections 20 and 20a and enable adjustment in accordance with the dimension of the upstanding support. Alternatively, however, chains 20 and 20a may be permanently attached to struts 16 with at least one chain removably attachable to tension clamp 22 by snaphook or the like.

Accordingly, device 10 may be mounted to support structure 12 by positioning the back edge of platform member 14 against support 12. With one of straps 20 or 20a suitably hooked to one of the eyelets 30, the other strap and tension clamp 22 can be wrapped around support 12 and one of the chain links of the other straps secured to the eyelet on the other strut, with platform 14 thereby "tacked" onto support 12 and straps 20 and 20a in manually induced tension. Thereafter, clamp 22 (illustrated more clearly in FIG. 5) may be tightened to furnish sufficient tension in straps 20 and 20a for completing a secure and stable attachment of platform member 14 to support 12. To this end, clamp 22 may be provided with fine adjustment means, such as threaded turnbuckle 22a, to permit adjustment to the initial manually induced tension (i.e., prior to final tightening) and thereby insure that a proper fastening tension will be transmitted to straps 20 and 20a when clamp 22 is tightened to complete mounting.

Advantageously, the back edge of platform member 14 may be formed with rounded indentation 14b' for accommodating a generally circular support structure. In addition, reinforcing block 32 may be fastened to the back edge of platform member 14, preferably with a similarly proportioned indentation, to strengthen back edge 14a and lend durability to the device. Moreover, even with reinforcing member 32, the portion of back edge 14 abutting support 12 remains relatively thin, thereby permitting attachment to trees, virtually irrespective of branch location.

Turning now to FIGS. 8-11, there is shown another embodiment of the portable platform device according to the present invention. As here embodied, struts 16 extend no more than a little beyond rear edge 14a of platform 14, and preferably about 1 to 3 inches, when disposed for mounting to support 12. Mounting means 18 include clamp 22 which may be attached directly to the back edge, or butt portion, of one of struts 16, and strap 20 attached to the back edge of the other strut, preferably by a hook or eyelet fastener similar to eyelet 30 described above with respect to FIGS. 1-4. Moreover, the device in accordance with this embodiment is preferably formed with indentation 14a' and with similarly indented reinforcing member 32, as more fully described hereinbefore.

Thus, for installation, back edge 14a of the platform is positioned adjacent support 12 with strap 20 manually pulled taut around support 12 and against clamp 22 which is attached to one of struts 16, and then suitably attached to the eyelet on the end of the other strut. Thereafter, clamp 22 which may, of course, include turnbuckle adjustment means 22a, may be tightened to generate a taut fastening force in strap 20, which is disposed generally parallel to the plane defined by platform 14, for securing platform member 14 firmly against support 12. As installed, the platform is capable of acting as a shelf for relatively light loads.

However, the embodiment of FIGS. 8-11 may be adapted for providing support capability for relatively heavy loads. To this end, elongate strap truss means may be attached to the two front corners of platform member 14 to extend diagonally upwardly therefrom and be attached to upstanding support 12. As preferably embodied, the elongate truss comprises a single elongate flexible strap, such as rope 34, fastened to two front corners (indicated at 14b and 14c) of platform member 14, advantageously by a fastener extending through both members 14 and 15. Rope 34, thus, extends from corners 14b and 14c to a convenient point above the tree (about 24 to 36 inches above platform 14), whereat the rope is wrapped around the tree to provide a generally diagonally extending rope truss of providing additional support to platform member 14 from its front end.

Advantageously, and as preferably embodied, rope 34 is wrapped and supported to support member 12 without the use of nails or other piercing fasteners by providing two loop-like portions in the rope and wrapping them around support 12 and holding the loops together, or at least near each other, by a suitable fastener. To this end, a load bearing hollow structure, such as steel ring or torroidal member 36, may be utilized to fasten the loops together around support 12. Accordingly, with rope 34 affixed to corner 14b, the truss may be formed by bringing rope 34 diagonally upward against one side of support 12 and around to the back thereof, thence through ring 36 and back somewhat over itself around to the front of support 12 and, thence, all the way around the other side of support 12, almost completely around to the back of support 12, again through ring 36, back somewhat over itself and diagonally downward to the other front corner 14c of platform member 14. Rope 34 is then pulled tightly and fastened, such as by tying, at corner 14c to form a flexible truss capable of providing substantial support capability to platform member 14.

Thus, with rope 28 attached to platform member 14 which contains symmetrically arranged holes 26 (substantially as described above with respect to FIG. 7b), the portable platform device can be folded into the back-pack frame shown in FIG. 7a.

It will be readily appreciated, however, that the invention in its broader aspects is not limited to the specific embodiments herein shown and described. Rather, variations may be made therefrom within the scope and spirit of the accompanying claims, without departing from the principles of the invention and without sacrificing its chief advantages. For example, in the embodiment illustrated in FIGS. 1-4, straps 20 and 20a can be attached to the bottom edges, or the inwardly facing surfaces of struts 16 rather than on the outwardly facing side of strut 16.

What is claimed is:

1. A portable platform device for mounting to trees, poles and other upstanding support structures, comprising:

a generally flat platform member having a back edge adapted to abut the upstanding support structure;

a pair of support struts attached, each along an edge portion, to the bottom surface of said platform member and extending beyond the back edge of said platform member; and adjustable mounting means for fastening said platform member to the upstanding support, said adjustable mounting means comprising:

a first generally flexible fastening member adapted to be attached to a first of said support struts, to a portion of said first support strut other than the edge thereof attached to the bottom surface of said platform member, a second generally flexible fastening member adapted to be attached to the second of said support struts, to a portion of said second support strut other than the edge thereof attached to the bottom surface of said platform member, and tension clamp means adapted to be coupled between, and to connect, said first and second flexible fastening members for permitting adjustable coupling of said first and second flexible fastening members around the upstanding support and between said support struts, such that when the back edge of said platform member is located in abutting relation to the support structure with said mounting means wrapped therearound and said flexible fastening members extending over the top edges of said support struts, said tension clamp means can be adjusted to provide a substantial tension force in said flexible fastening members for securing said platform member to the upstanding support, said force acting generally parallel to the plane defined by said platform member when attached to said support structure and said struts bearing against said flexible fastening members when said platform member is loaded, thereby to provide a generally stable platform extending generally perpendicular to the support structure, capable of supporting a person in seated and standing postures.

2. A portable platform device according to claim 1, wherein said support struts are pivotally mounted to said platform member to enable said platform member to be capable of attachment to support structures of greatly varying widths and to enable said platform device to be folded into a convenient back-pack frame, and wherein said flexible fastening members are attached to said support struts at points generally near the plane defined by said back edge of said platform member.

3. A portable platform device according to claim 2 wherein said fastening members are elongate chains and wherein at least one of said flexible fastening members is attached to a support strut by hook means to provide adjustable attachment means for said flexible fastening members.

4. A portable platform device according to claim 3 wherein said support struts are adapted to extend at least about six inches beyond the back edge of said platform member when disposed to be attached to said upstanding support structure.

5. A portable platform device according to claim 4 wherein said back edge of said platform member is formed with a generally rounded indentation in the portion thereof adapted to abut the upstanding support structure.

6. A portable platform device according to claim 5 which further includes a reinforcing member attached along the back edge of said platform member at the portion thereof adapted to abut the upstanding support structure, said reinforcing member being formed with an indentation substantially corresponding to the indentation formed in the back edge of said platform member.

7. A portable platform device according to claim 4 wherein said flexible fastening members are attached to the outwardly facing sides of said support struts.

8. A portable platform device for mounting to trees, poles and other upstanding support structures, comprising:

a generally flat platform member having a back edge adapted to abut the upstanding support structure;

a pair of support struts pivotally mounted to the bottom suface of said platform member; and, adjustable mounting means attached to the rearwardly facing edges of said struts for fastening said platform member to the upstanding support, said adjustable mounting means comprising:

at least one generally flexible fastening member adapted to be attached to a first of said support struts, and a tension clamp adapted to be connected to said fastening member and to be coupled to the second of said support struts for permitting adjustable coupling of said elongate fastening member around the upstanding support structure and between said support struts; a generally hollow load-bearing member; and an additional, substantially elongate, flexible support member adapted to be attached at two points generally along the front edge of said platform member and to extend generally diagonally upwardly therefrom for being wrapped around the upstanding support by two loop-like portions formed by said additional support member when wrapped around the upstanding support and coupled together by said load bearing member, such that when the back edge of said platform member is located in abutting relation to the support structure with said adjustable mounting means wrapped therearound, said tension clamp can be adjusted to provide a substantial tension force in said flexible fastening member, said force acting generally parallel to the plane defined by said platform member when attached to the upstanding support structure, and said additional flexible member can be wrapped through said load bearing member and around the upstanding support to form a generally taut diagonally extending truss for bracing said platform member thereby to secure said platform member to the support structure and provide a platform extending generally perpendicular to the support structure, said pivotally mounted support struts enabling said platform member to be mounted to upstanding supports of varying diameters and configurations.

9. A portable platform device according to claim 8 which further includes a plurality of spaced generally symmetrically arranged openings adapted to accommodate said additional support member, such that said additional support member may be laced through said openings and wrapped around the shoulders of a person to provide a convenient package for carrying on the person's back.

10. A portable platform device according to claim 9 wherein said back edge of said platform member is formed with a generally rounded indentation in the portion thereof adapted to abut the upstanding support structure.

11. A portable platform device according to claim 10 which further includes a reinforcing member attached along the back edge of said platform member at the portion thereof adapted to abut the upstanding support structure, said reinforcing member being formed with an indentation substantially corresponding to the indentation formed in the back edge of said platform member.

12. A portable platform device according to claim 11 wherein said support struts are dimensioned to extend at least a little beyond the back edge of said platform member when disposed for mounting to the upstanding support structure.

13. A portable platform device according to claim 12 wherein said support struts are dimensioned to extend between about one inch and about three inches beyond the back edge of said platform member when disposed for mounting to the upstanding support structure.

* * * * *